United States Patent
Jurica (12)

(10) Patent No.: US 6,170,905 B1
(45) Date of Patent: *Jan. 9, 2001

(54) TRUCK BED AND METHOD OF MANUFACTURE

(75) Inventor: Joseph J. Jurica, Mt. Clemens, MI (US)

(73) Assignee: Pullman Industries, Inc., Pullman, MI (US)

( * ) Notice: Under 35 U.S.C. 154(b), the term of this patent shall be extended for 0 days.

This patent is subject to a terminal disclaimer.

(21) Appl. No.: 09/202,223
(22) PCT Filed: May 23, 1997
(86) PCT No.: PCT/US97/09859
§ 371 Date: Dec. 9, 1998
§ 102(e) Date: Dec. 9, 1998
(87) PCT Pub. No.: WO97/47512
PCT Pub. Date: Dec. 18, 1997

Related U.S. Application Data

(63) Continuation of application No. 08/661,062, filed on Jun. 10, 1996, now Pat. No. 5,730,486.

(51) Int. Cl.⁷ .................................................. B62D 25/20
(52) U.S. Cl. ............................ 296/183; 52/797; 296/182
(58) Field of Search .................................. 296/183, 182, 296/204, 29, 30; 52/798.1, 800.11

(56) References Cited

U.S. PATENT DOCUMENTS

| | | |
|---|---|---|
| 1,085,431 | 1/1914 | Kane . |
| 1,462,474 | 7/1923 | Atkinson . |
| 1,469,321 | 10/1923 | Kramer . |
| 1,508,566 | 9/1924 | Moffat . |
| 1,806,428 | 5/1931 | Travis . |
| 2,073,058 | 3/1937 | Greene . |
| 2,199,377 | 4/1940 | Tangerman . |
| 2,301,636 | 11/1942 | Nicol . |
| 2,671,491 | 3/1954 | Biordi et al. . |

(List continued on next page.)

FOREIGN PATENT DOCUMENTS

| | | |
|---|---|---|
| 30 12 567 | 10/1981 | (DE) . |
| 30 12 567 A1 | 10/1981 | (DE) . |
| 1 329 659 | 5/1963 | (FR) . |
| 1 432 250 | 2/1996 | (FR) . |
| WO93/19972 | 10/1993 | (WO) . |

OTHER PUBLICATIONS

Drawing from copending application No. 08/780 834, filed Jan. 10, 1997 (Atty Ref: Pullamn Case 4).

Drawings from copending application No. 08/903 887, filed Jul. 31, 1997 (Atty Ref: Pullman Case 5).

Primary Examiner—D. Glenn Dayoan
Assistant Examiner—Jason Morrow
(74) Attorney, Agent, or Firm—Flynn, Thiel, Boutell & Tanis, P.C.

(57) ABSTRACT

An improved vehicle bed assembly with a floor pan having strengthening ribs extending longitudinally throughout the entire length of the floor pan so as to terminate at front and rear edges thereof. The rear edge of the floor pan has a downwardly extending rear flange to reinforce the rear edge. A rear cross rail supports the floor pan along the rear edge thereof directly adjacent the rear flange. The rear cross rail has rib projections which from below nest into and are fixedly secured to the ribs of the floor pan. The rear cross rail reinforces the rear part of the floor pan by increasing the thickness of metal at the rear part, i.e. the thickness at the rear part equals the combined thicknesses of the floor pan and rear cross rail, which increase thickness exists at the corner-like rear edge of the bed.

8 Claims, 4 Drawing Sheets

U.S. PATENT DOCUMENTS

| | | |
|---|---|---|
| 2,775,284 | 12/1956 | Hermann . |
| 2,853,330 | 9/1958 | Harry . |
| 2,988,033 | 6/1961 | Gapp . |
| 3,059,733 | 10/1962 | Hermann . |
| 3,110,371 | 11/1963 | DeRidder . |
| 3,209,432 | 10/1965 | Cape . |
| 3,253,375 | 5/1966 | Takehara . |
| 3,310,925 | 3/1967 | LeBrun . |
| 3,481,643 | 12/1969 | Campbell . |
| 3,838,590 | 10/1974 | VanDijk . |
| 4,014,148 | 3/1977 | Harter . |
| 4,109,503 | 8/1978 | Francon et al. . |
| 4,188,058 | 2/1980 | Resa et al. . |
| 4,215,898 | 8/1980 | Ulics . |
| 4,354,708 | 10/1982 | Koto . |
| 4,631,891 | 12/1986 | Donavich . |
| 4,750,776 | 6/1988 | Barben . |
| 4,914,886 | 4/1990 | Eriksson et al. . |
| 5,137,322 | 8/1992 | Muirhead . |
| 5,188,418 | 2/1993 | Walworth, Jr. et al. . |
| 5,231,862 | 8/1993 | Ashley . |
| 5,544,932 | 8/1996 | Walworth, Jr. et al. . |
| 5,575,525 | 11/1996 | Walworth, Jr. et al. . |
| 5,730,486 * | 3/1998 | Jurica ................................... 296/183 |
| 5,755,481 | 5/1998 | Emery . |
| 5,938,272 * | 8/1999 | Jurica et al. ......................... 296/183 |

* cited by examiner

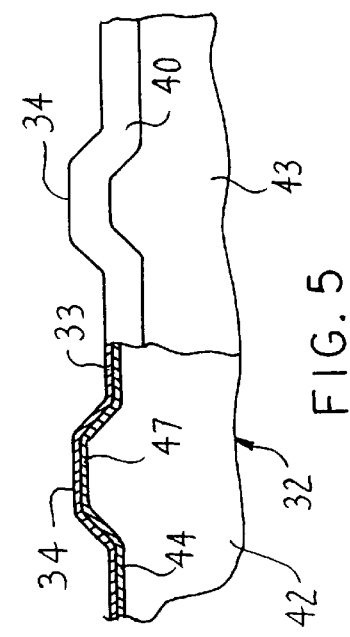
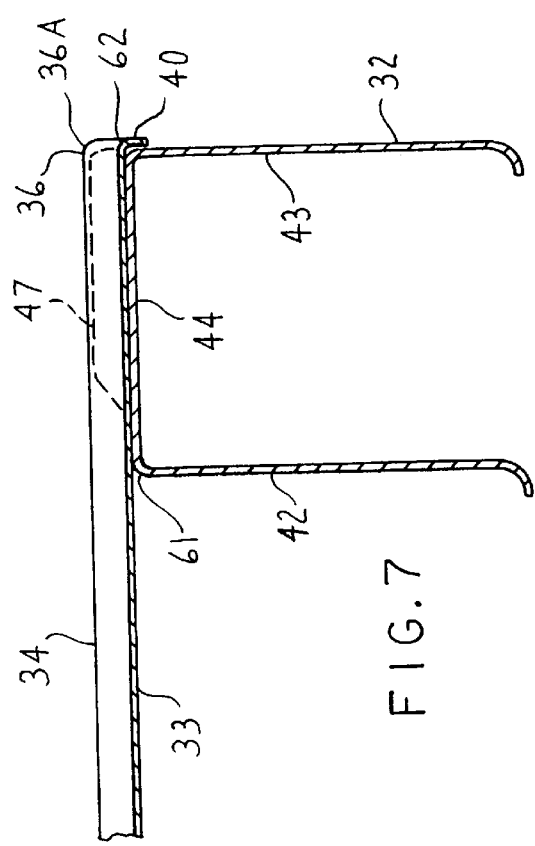
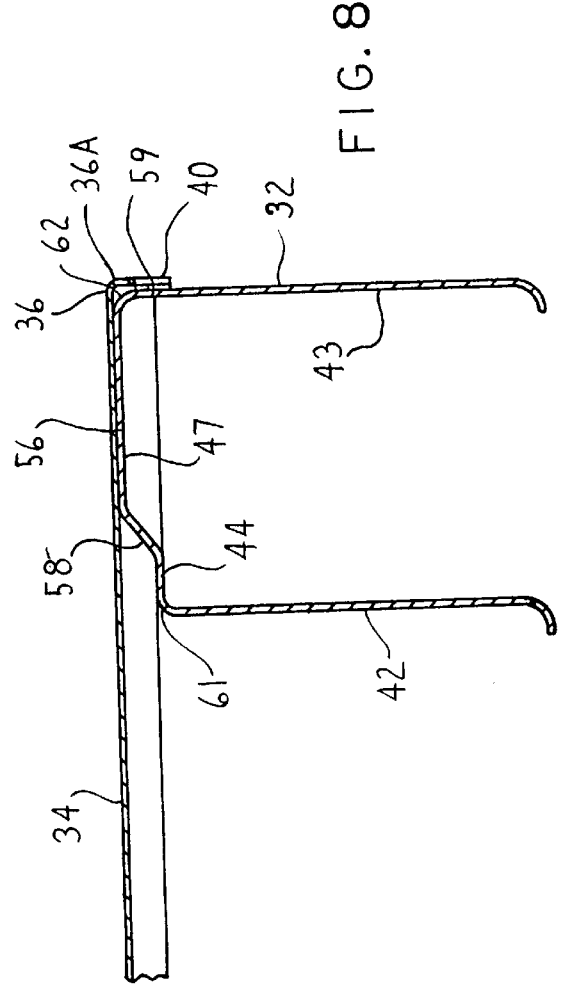

TRUCK BED AND METHOD OF MANUFACTURE

This application is a 35 USC §371 nationalization of PCT/US97/09859, which is a continuation of U.S. Ser. No. 08/661,062 filed Jun. 10, 1996, now U.S. Pat. No. 5,730,486.

FIELD OF THE INVENTION

This invention relates to the construction of a truck bed, such as a pickup truck bed, and in particular relates to an improved construction of the bed floor and rear cross rail, and an improved constructional method.

BACKGROUND OF THE INVENTION

A box of a truck, such as a pickup truck, is illustrated in FIG. 1. This box conventionally includes a horizontally enlarged floor or bed assembly 12 which extends sidewardly between and is joined to generally parallel and upwardly extending side panels or walls 13. The side panels 13 conventionally have wheelwell housings 14 formed therein, the latter typically projecting at least inwardly a small extent into the interior of the box. The front end of the floor assembly 12 is also rigidly joined to an upwardly projecting front wall or panel 15, the latter extending between and being rigidly fixed to the side panels 13. The rear of the box is normally closed by a rear panel 16, the latter conventionally being an openable tailgate which is conventionally hingedly joined to the box and can swing into an open generally horizontal position wherein it is substantially flush with the floor assembly to provide access to the interior of the box.

This box, and specifically the floor or bed assembly 12, conventionally includes a horizontally enlarged main bed member 17, commonly referred to as the floor pan, which defines the actual floor of the box and extends lengthwise between the front and rear ends of the box, and has a width which normally substantially spans the width of the opening between the wheelwell housings. This main floor pan 17 is supported on a front cross rail 18, several intermediate cross rails 19, and a rear cross rail or sill member 21, the latter all extending transversely under the pan and being fixedly secured thereto, such as by spot welding. Some of these cross members, such as the front rail 18, the frontmost intermediate rail 19 and the rear sill 21 are typically fixedly secured to the vehicle frame (not shown) in a conventional manner.

The bed assembly 12 also normally includes secondary bed or floor pan members 22, the latter being positioned adjacent and fixedly joined to opposite longitudinal edges of the main floor pan 17 so as to occupy the regions of the bed disposed forwardly and rearwardly of the wheelwell housings 14.

In the pickup box as conventionally constructed, the main floor pan 17 is provided with stiffening ribs 23 which project upwardly from the pan, with a plurality of such ribs being generally uniformly sidewardly spaced apart across the width of the pan and extending longitudinally of the pan over a majority of the length thereof. These ribs, which are deformed upwardly from the pan to define a downwardly-opening channel-like cross section, generally extend rearwardly from the front free edge of the main pan 17 but the ribs normally terminate in tapered rib ends 24 which merge downwardly into the planar profile of the pan 17 at a location disposed close to but spaced forwardly a small distance from the rear free edge 25 of the pan. The rear edge portion of the main pan 17, namely the flat portion thereof which is free of the ribs, is then normally seated within a shallow recess formed in the topwall of the rear sill member 21 so as to be substantially flush with the upper surface of the sill member, with the rear pan and sill member then being suitably fixedly secured together, such as by spot welding. This arrangement enables the groove-like regions defined between adjacent ribs 23 to freely open outwardly through the rear end of the bed assembly, and hence prevent creation of pockets or recesses which would collect dirt or moisture.

A bed assembly having the structure described above has, for a very long time, been constructed using individual members which have been stamped utilizing large forming presses. That is, the main floor pan 17 as well as the cross rails 18, 19 and 21 have been conventionally formed from flat steel sheets by positioning a precut steel sheet in a forming press which deforms the sheet to define the desired cross section of the finished member. This stamping or press-forming technique, even though extensively utilized for many years, and which in fact is still in use, possesses recognized disadvantages which have nevertheless been long tolerated in view of the belief that this was the best manner of constructing the bed assembly.

More specifically, and particularly with respect to the main floor pan 17, the current and almost universally utilized technique of stamping the pan has resulted in limitations which have restricted optimum construction of the pan. For example, to stamp the main floor pan 17, a large rectangular sheet must be precut in accordance with the size of the desired pan being stamped. The sheet is initially of excess width so as to provide portions along opposite edges of the sheet which can be used for clamping the sheet and holding it in position when the sheet is positioned within the press and subjected to the stamping operation. Further, during the actual stamping operation, the material of the sheet is physically deformed by the stamping die so as to permit creation of the longitudinal ribs. This necessarily results in significant changes in thickness of the sheet material due to the deformation which is caused during the rib formation process. Not only does the sheet undergo significant changes in thickness, but this change in thickness is also of varying amounts at different locations across the rib, or through the cross section of the sheet containing the ribs, so that the resulting stamped floor pan has a sheet thickness which has significant variation therein. This thickness variation can in some instances be as much as 40% to 50%. This stamping process has also been observed to result in bends or corners which are inconsistent in terms of both material thickness and included angle, and have provided a finished exterior appearance which permits such irregularities to be visually observed. This stamping operation also requires, after the pan has been stamped, that the pan be subjected to a further stamping or cutting operation which is effective for removing the clamping strip portions on opposite sides of the sheet, which strip portions are disposed of as scrap.

In view of the inherent but inconsistent thickness reductions which occur during forming of the pan by the stamping or pressing process, the pan must also be initially formed from a sheet material of greater thickness than desired so as to compensate for the expected thickness reductions which occur during the stamping operation. This increases the overall weight of the pan. Further, in view of the significant size of the main floor pan and the fact that it is deformed or stamped in basically a single pressing operation, this also necessitates utilization of an extremely large and high-capacity forming press in order to accommodate both the size of the sheet and the significant pressing force encountered during the simultaneous deformation of the numerous ribs which extend longitudinally thereof. Further, these stamping operations necessarily can normally be successfully carried out only if lower strength and softer sheet steels are utilized since harder and higher strength steels will typically split or crack if subjected to severe deformation of the type encountered in the conventional pan stamping operation.

To improve on the above described truck bed structure and the forming method thereof, the assignee of this application developed the improved truck bed structures and forming methods as disclosed in U.S. Pat. No. 5,188,418, U.S. Pat. No. 5,544,932, and PCT published application WO 93/19972. All are assigned to Pullman Industries, the assignee hereof, and are herein incorporated by reference.

In said U.S. Pat. No. 5,188,418, a truck bed is disclosed including a floor pan having strengthening ribs constructed by a roll forming process. A rear sill member cooperates with the rear edge of the floor pan to close off the floor pan from the rear and substantially abut the rear free edge of the floor pan. The rear sill member has upward protrusions which interfit within and close off the rearward ends of the ribs formed in the pan. U.S. Pat. No. 5,544,932 relates to a variation wherein the rear sill is formed of two distinct elongate components, the first being welded on top of the second, with the first elongate component having rib-closing protrusions to close off the ribs on the floor pan.

In a continuing effort to improve truck beds, a truck bed manufactured substantially by roll forming techniques having a strengthened rear edge and rear part of the truck bed is desired to prevent damage to the truck bed. Thicker truck beds may be manufactured, however this increases the cost of the truck bed and makes it more difficult to efficiently form the truck bed. Further, the increased weight of a thicker truck bed decreases the efficiency of operation of a truck, i.e. gas mileage, suspension wear, tire wear, etc.

Accordingly, it is an object of this invention to provide an improved truck bed assembly and forming method which overcomes not only the disadvantages associated with the conventional and long-utilized stamped bed assembly as described above, but which is also believed to further improve upon the desirable truck bed structures and forming methods disclosed in the aforesaid patent and copending application.

More specifically, the present invention relates to an improved truck bed assembly wherein the floor pan has a flange on the rear edge thereof, which rear flange reinforces the rear edge of the floor pan where the floor pan is most susceptible to damage.

The present invention, in addition to the improvements and advantages briefly summarized above, is also believed to provide cost savings with respect to the overall manufacturing process, and permits creation of cross sections or shapes in the bed which are not possible with a stamping operation, including the creation of sharper corners having a higher consistency with respect to both curvature and thickness of bends.

Other objects and purposes of the invention will be apparent to persons familiar with structures and processes of this general type upon reading the following specification and inspecting the accompanying drawings.

BRIEF DESCRIPTION OF THE DRAWINGS

FIG. 5 is an enlarged, fragmentary sectional view taken along line 5—5 in FIG. 6.

FIG. 7 is an enlarged, fragmentary sectional view taken along line 7—7 in FIG. 6.

FIG. 8 is an enlarged, fragmentary sectional view taken along line 8—8 in FIG. 6.

Figure 1:
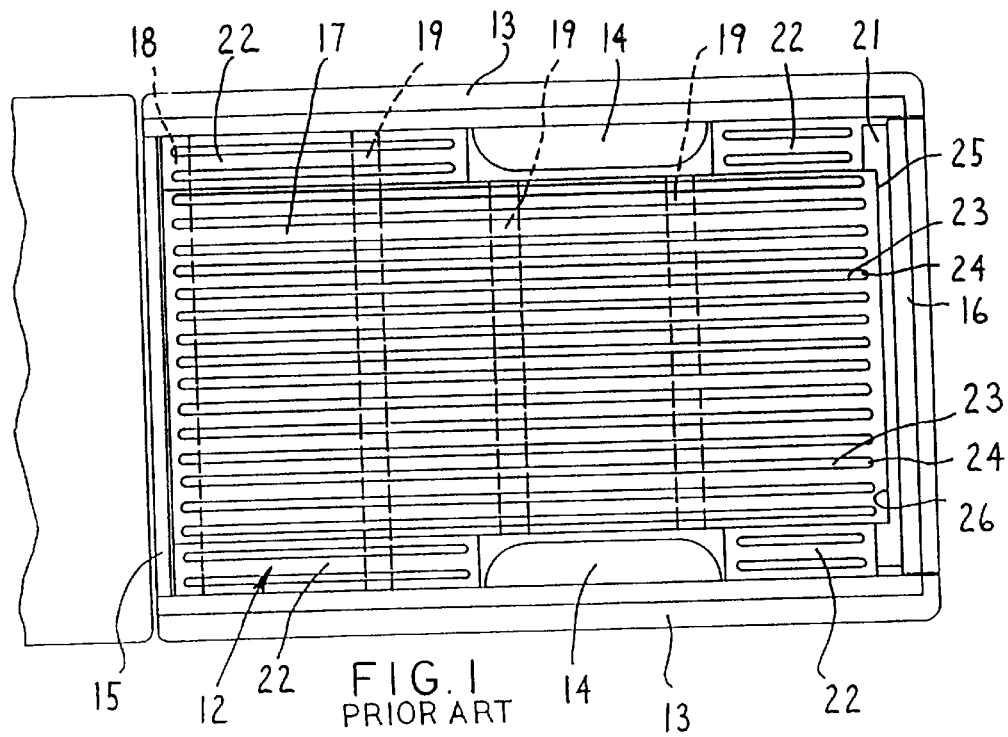
FIG. 1 is a top plan view of a conventional pickup truck box which illustrates a well known construction of the bed assembly.

Certain terminology will be used in the following description for convenience in reference only, and will not be limiting. For example, the words "upwardly", "downwardly", "rightwardly" and "leftwardly" will refer to directions in the drawings to which reference is made. The word "upwardly" will also be used in reference to an exposed top surface of the floor pan of the bed assembly. The words "inwardly" and "outwardly" will refer to directions toward and away from, respectively, the geometric center of the box or bed assembly, or designated parts thereof. Said terminology will include the words specifically mentioned, derivatives thereof, and words of similar import.

DETAILED DESCRIPTION

The present invention will now be described, particularly with reference to the structure shown by FIGS. 2—8. The floor or truck bed assembly 30 according to the present invention employs a main bed or floor pan 31 which cooperates with and has the rear portion thereof supported on a rear cross rail 32. The main pan 31 is also supported on a front cross rail 38 and several (three in the illustrated embodiment) intermediate cross rails 39.

The main floor pan 31 is formed, preferably roll formed, from a thin sheet 33 of steel, preferably high strength steel having a thickness of about 0.8 mm, so that the main pan 31 is of an integral and monolithic one-piece construction with the pan having substantially uniform thickness throughout the transverse cross sectional extent thereof. The main pan 31, due to the deforming of the thin sheet 33, has a plurality of longitudinally-elongate stiffening ribs 34 projecting upwardly from the plane of the thin sheet 33. These ribs 34 are generally uniformly sidewardly spaced apart in the transverse or widthwise direction of the pan 31, with the ribs 34 extending longitudinally of the pan in generally parallel relationship. The ribs 34 have a generally inverted channel-like or U-shaped cross section, whereby each adjacent pair of ribs define an elongate valley therebetween as defined by the original thin sheet 33. The ribs 34 project longitudinally throughout the entire length of the floor pan 31 so as to terminate at the respective front and rear edges 35, 36 of the thin sheet 33. These ribs result in the main floor pan having a substantially uniform transverse corrugated cross section throughout the entire longitudinal length thereof.

Figure 2:
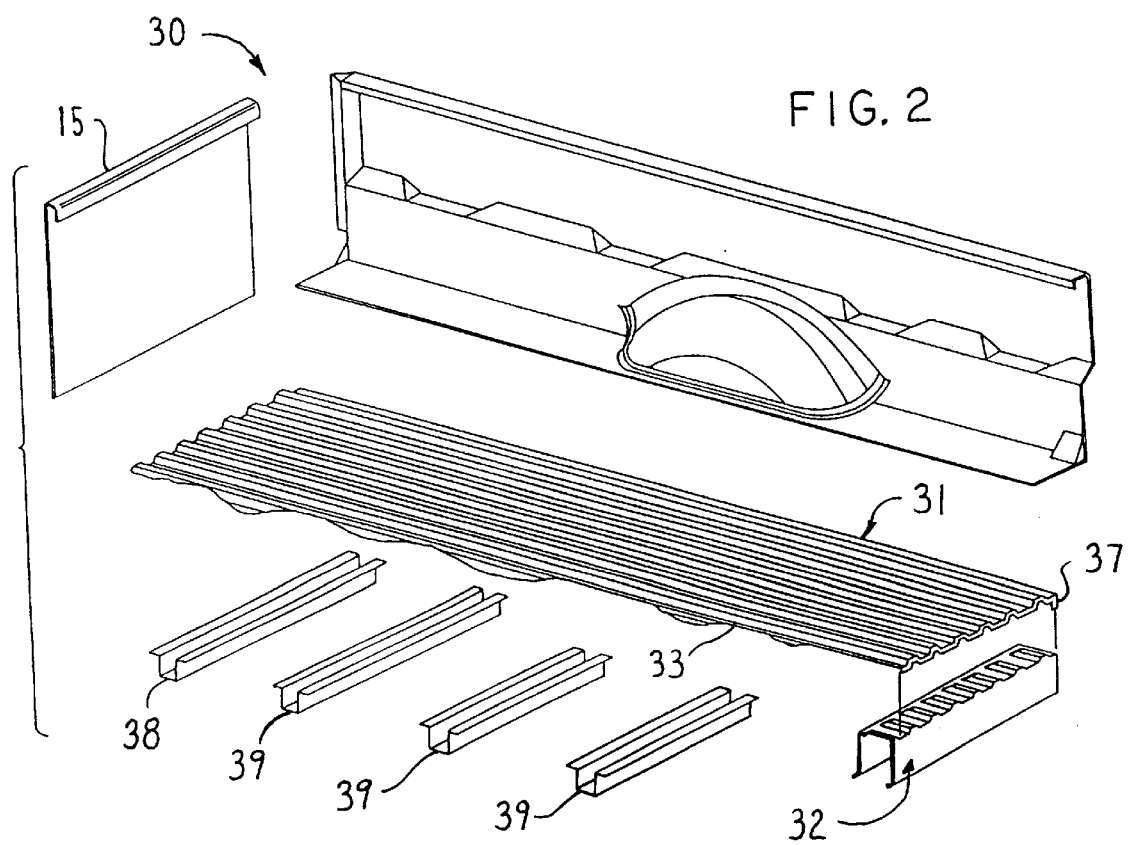
FIG. 2 is an exploded perspective view illustrating the basic components which comprise the improved truck bed assembly of this invention.
Figure 3:
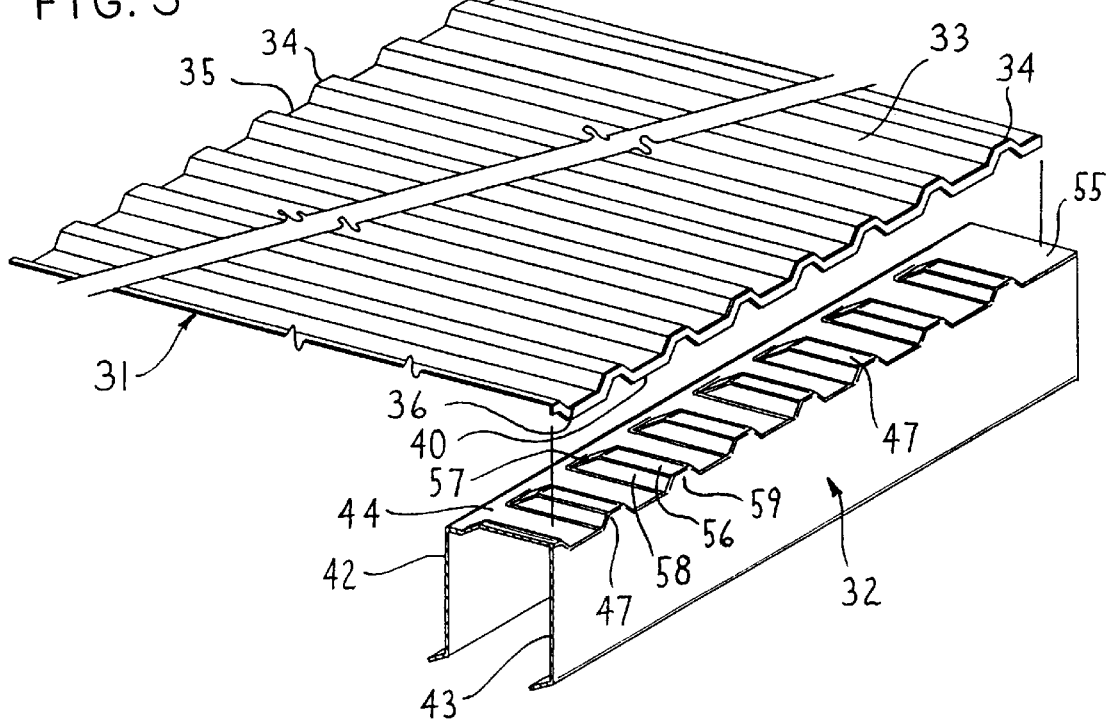
FIG. 3 is an enlarged, fragmentary isometric view which illustrates the structure of and cooperation between the main floor pan and rear cross rail according to the present invention.
Figure 4:
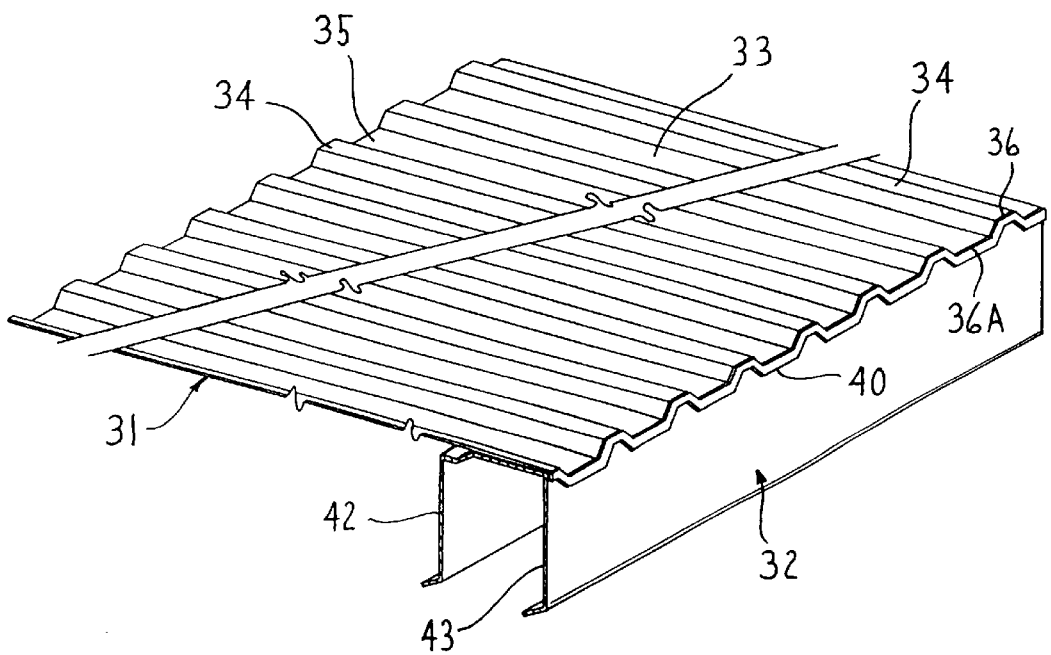
FIG. 4 is a view similar to FIG. 3 but showing the assembly of the main floor pan and rear cross rail.
Figure 6:
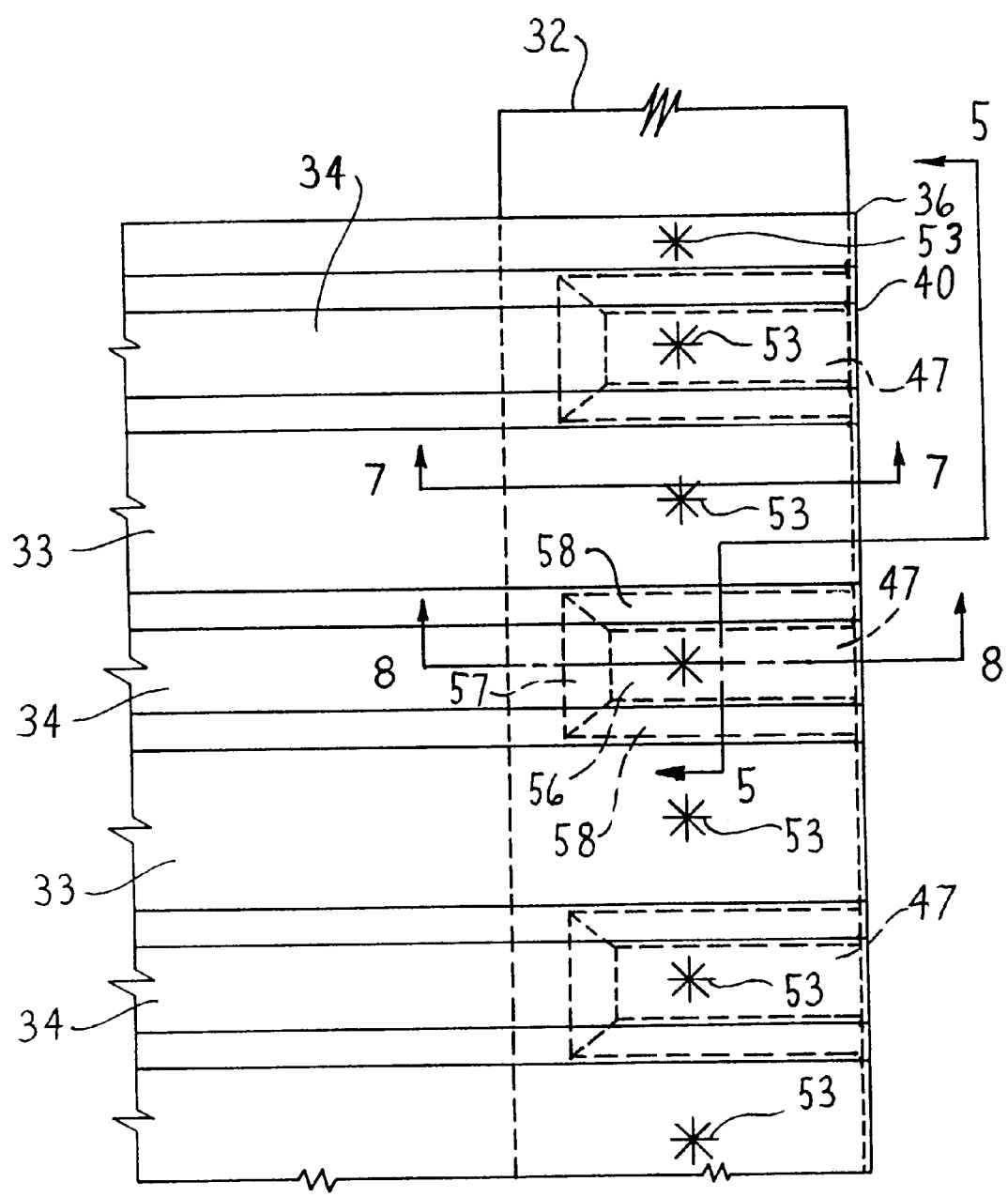
FIG. 6 is a fragmentary top view which illustrates the structural connection of the main floor pan to the rear cross rail.

The main floor pan 31 may have an edge flange 37 extending longitudinally along each side edge and projecting downwardly, which edge flange 37 is integrally joined to and is bent downwardly from the floor pan 31 (FIG. 2). This edge flange 37 is provided so as to permit securement, such as by spot welding, to a similar adjacent edge flange formed on the secondary bed members 22 (FIG. 1). This edge flange 37 may also be provided with cutouts or notches (not shown) to accommodate therein the front cross rail 38, the frontmost intermediate rail 39 and the rear cross rail 32. This flange 37 projects downwardly directly adjacent the remaining two intermediate cross rails 39 which are of shorter length and positioned generally between the wheelwell housings. However as discussed below, the main floor pan 31 and secondary bed members 22 (FIG. 1) are preferably formed from a single sheet, thus the side flange 37 is not required.

A rear flange 40 extends transversely across the floor pan 31 along the rear edge 36 and projects substantially perpendicularly downwardly from the floor pan 31. This rear flange 40 follows the profile of rear edge 36 up and then down and across the ribs 34 and then down and across the plane of the floor pan 31. The rear flange 40 is bent downwardly out of the same thin sheet 33 that is roll formed into the floor pan 31 to define a rear corner 36A. The rear flange 40 reinforces the rear corner 36A to assist in protecting it from damage during loading and unloading of the truck bed. To properly reinforce the rear corner 36A of the floor pan 31, the rear flange 40 is preferably about ¼ inch high.

The rear cross rail 32 is defined by a one-piece channel-like member which is of a generally downwardly-opening channel or U-shaped cross section. This channel-like member 32 is of a length so as to extend transversely across the entire rear edge of the truck bed and terminates adjacent the opposite side panels of the truck box.

The channel-like member defining the rear cross rail 32 includes downwardly projecting front and rear vertical sidewalls 42 and 43, respectively terminating in lower free edges which are significantly spaced apart so as to define an open mouth which extends longitudinally along the member to hence provide upward accessibility into the interior of the channel-like member. The sidewalls 42 and 43 are rigidly joined together in generally parallel relationship by a topwall 44. The rear cross rail 32 may be roll formed to permit formation of the desired channel-like cross section. Rear sidewall 43 contacts and in turn creates a double thickness laminate with the rear flange 40, thereby further strengthening both the rear flange 40 and the rear edge 36 of the floor pan 31.

The rear cross rail 32 also has a plurality of rib projections 47 affixed to and projecting upwardly from the topwall 44 of the channel-like member. The plurality of rib projections 47 are disposed in uniformly spaced relationship along a row which extends generally longitudinally of the rear cross rail 32, with the number of and spacing between the rib projections 47 corresponding to the number of and sideward spacing between the strengthening ribs 34 provided on the main pan 31.

The rib projections 47 are individually elongated in the longitudinal direction of the ribs 34 and have a topwall portion 56, a front wall portion 57, two side wall portions 58, and a rear wall portion 59. The rear wall portion 59 is integral and coplanar with the rear sidewall 43. The topwall portion 56 is substantially horizontally planar and extends between the front, side, and rear wall portions 57, 58, 59. The side wall portions 58 and the front portion 58 incline upwardly from the topwall 44 to the topwall portion 56 of the rib projection 47. The front wall portion 57 begins its incline at a select distance rearwardly from a front edge 61 of the rear cross rail 32. Both the topwall 44 and the topwall portion 56 end at a rear edge 62 of the rear cross rail 32. The rear edge 62 is located at the junction of either the topwall 44 to the rear sidewall 43 or the topwall portion 56 to the rear portion 59. This rear edge 62 thus has a generally sinusoidal profile or shape which generally corresponds to the same shape defined by the rear edge 36 of the floor pan 31.

The rib projections 47 function as supportive guides, and are adapted to nest within the rearward ends of the respectively adjacent ribs 34 as defined on the floor pan 31. For this purpose, projections 47 have exterior cross sections (that is, an outer surface) which have a size and configuration which substantially correspond to the interior cross section (that is, the inner surface) of the rib 34. Hence, when the rear portion of the floor pan 31 is supportively engaged on the topwall 44 of the rear cross rail 32, each rib projection 47 projects into the adjacent inverted channel-like aligned rib 34 to provide both proper alignment and interior support for the rib 34 and thus the floor pan 31. When thus assembled, then the pan 31 is fixedly secured to the rear cross rail 32 by suitable spot welds, which spot welds preferably are provided not only at the valleys of the pan but also at the top of the ribs, such spot welds being indicated at 53 in FIG. 6. Thus, when assembled, the truck bed has increased material thickness where the rear cross rail 32 supports the floor pan 31, thereby advantageously increasing the structural strength in the rear area of the truck bed, particularly at the rear corner.

The rear corner 36A of the floor pan 31 is strengthened by increasing the thickness and the shape of relatively sharp rear corner 36A. The relatively sharp rear corner 36A is approximately 90° between the floor pan 31 and the rear flange 40. The relatively sharp corner 36A joins two planes, one containing the floor pan 31 and one containing the rear flange 40, which are transverse to each other. This shape increases the structural strength of the corner 36A and hence the truck bed. The rear corner 36A is further strengthened by supporting the rear area of the floor pan 31 by the rear cross rail 32. The rear cross rail 32 also reinforces the rear flange 40 by pressing against the rear flange 40 from under the floor pan 31.

As illustrated by FIGS. 5–8, the rib projections 47 are preferably hollow and open downwardly through the interior of the channel-like rear cross rail 32, with these rib projections 47 being of thickness similar to and integrally and monolithically joined to the topwall 44. The outside of the rib projections 47 are dimensioned to closely contact the underside of the strengthening ribs 34 thereby increasing the thickness of the truck bed in the rear part of the floor pan 31 where it is directly supported by the rear cross rail 32. The rib projections 47 extend upwardly from the topwall 44 (FIG. 8). The rear sidewall 43 of the rear cross rail 32 extends downwardly from the rear edge of the rib projection 43. To achieve this desired structure, the rear cross rail 32 may preferably be initially roll formed, and then subjected to a pressing or stamping operation which deforms the topwall 44 so as to create the rib projections 47. The rib projections 47 extend up into the ribs 34 and extend rearwardly toward the rear flange 40. Thus, the downward extending rear sidewall 43 is integrally connected to the rib projection 47, thereby reinforcing the rear flange 40 on the pan 31 in the same manner as the rear sidewall 43 reinforces the rear flange 40 in the areas lacking the ribs 34 as discussed above. Further, the rear flange 40 assists in preventing dirt and moisture from entering between the rear cross rail 32 and the floor pan 31 because the rear flange 40 extends downwardly along the entire length of the rear edge 36 of the floor pan 31 and preferably sealing contacts the rear side wall 43.

The front cross rail 38 and the intermediate rails 39 are also preferably roll formed, and each is of a generally upwardly-opening U-shaped or channel-shaped cross section. In fact, the three intermediate cross rails 39 are all typically of identical cross sections, which cross section is generally hat-shaped in that it includes a generally upwardly-opening U-shaped cross section having generally horizontal top flanges which project outwardly in opposite directions from the upper edge of each leg, which top flanges directly engage the bottom surface of the pan 31 and are fixedly secured thereto, such as by spot welds. The three intermediate rails 39 are typically of identical cross section, with the only difference being in their lengths. The front cross rail 38 also has top flanges similar to the rails 39, but one of the top flanges also has an additional forwardly and downwardly projecting flange for securement to the front panel 15 of the box.

The bed assembly of this invention utilizes and is constructed from the main floor pan 31, the rear cross rail 32, the front cross rail 38, and the intermediate cross rails 39, all of which are suitably fixedly secured, as by spot welding, and all of which are preferably formed primarily by roll forming.

In an additional embodiment, the bed assembly is completed by provision of secondary bed members similar to the members 22 of FIG. 1, which members can be constructed in a conventional manner, such as by being stamped if desired, so as to define the regions of the bed positioned forwardly and rearwardly of the wheelwell housings. The rearmost secondary bed members 22 will also be dimensioned so as to engage the end portions of the rear cross rail 32, such as the portion designated 55 in FIG. 3 (shown without portion 55 in FIG. 4), which portion is free of rib projections, so as to ride on the topwall 44 to hence permit spot welding to the topwall 44. These secondary bed members 22 will typically have the ribs stamped therein so as to terminate short of the rear edge thereof, as illustrated by FIG. 1, whereby the portion 55 of the rear cross rail 32 need not be provided with rib projections 47. However, it will be understood that these secondary bed members 22 and the end portions 55 of the rear cross rail 32 can be formed with ribs and rib projections in the same manner as the main pan 31 if desired, although such is believed unnecessary.

While the invention described above contemplates use of the roll formed main pan 31 in conjunction with separately formed secondary pans 22, it is preferred that the main and secondary pans be roll formed as an integral one-piece member which, after completion of the roll forming, will be subsequently processed so as to create wheelwell openings in opposite sides portions thereof.

As illustrated in FIG. 5, it is readily apparent that the rear part of the truck bed is of increased (i.e., substantially double) thickness due to the overlapping of the floor pan 31 on the topwall 44 of the rear cross rail 32 along the entire rear edge of the truck bed. This thus results in increased strength at the rear bed part which is the area of high impact loads, particularly during loading and unloading of the truck bed.

The present invention also contemplates and permits the floor pan to be roll formed from laminated sheet material such as steel sheet having a plastic sheet layer laminated over the top thereof. Such construction may eliminate the need for a separate bed liner.

While the invention has been described for use on a pickup truck, it will be appreciated that this improved bed construction can also be used on other vehicles, particularly vans.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for forming a bed assembly for a vehicle, such as a pickup truck, comprising the steps of:

roll forming a horizontally enlarged floor pan member from a thin sheetlike material with said floor pan member having transversely extending front and rear edges and a plurality of generally parallel and sidewardly spaced stiffening ribs formed in and extending longitudinally of said floor pan member and terminating at said front and rear edges;

thereafter transversely displacing a longitudinally short portion of said stiffening ribs of said floor pan member adjacent said rear edge to define a flat rear flange which extends along the rear edge in transverse relation to the longitudinally extending direction of said stiffening ribs and which, in conjunction with a rear portion of said pan member disposed adjacent said rear flange, defines a rear support portion of said pan member;

forming a sill structure having an elongate upper surface which extends generally transversely with respect to the longitudinal direction of said pan member;

relatively positioning said pan member and said sill structure so that said sill structure is positioned under and extends transversely across said pan member directly adjacent said rear flange so that the rear support portion of said pan member is supported on said sill structure and said rear flange is disposed directly adjacent and in overlapping relationship to an exterior surface of said sill structure; and fixedly securing said rear support portion of said pan member to said sill structure to at least partially define said bed assembly.

2. A process according to claim 1, wherein said pan member is formed by roll forming an enlarged and relatively flat sheet of metal so that the stiffening ribs extend continuously throughout the length of the sheet and terminate at the front and rear edges of the pan member, and wherein said rear flange is formed by deforming said sheet after the stiffening ribs have been rolled formed therein.

3. A process according to claim 1, wherein said step of forming the sill structure includes forming a plurality of upwardly extending projections associated with and projecting upwardly from an upper surface of said sill structure at spaced intervals therealong with said upwardly cantilevered projections being positioned and configured so as to nestingly and supportingly fit within the stiffening ribs defined in said pan member.

4. A process according to claim 1, wherein said rear flange is deformed downwardly.

5. A vehicle bed assembly having a horizontally-enlarged floor member constructed from a thin metal sheet and having a plurality of generally parallel and sidewardly-spaced stiffening ribs extending longitudinally toward a rear edge thereof, said stiffening ribs being of generally downwardly-opening channel-like cross sections which project upwardly from the metal sheet, the improvement comprising:

said floor member comprising a one-piece monolithic roll-formed pan member of substantially uniform thickness including a substantially flat and planar rear flange fixedly joined to and deformed from rear ends of said ribs and extending transversely across said pan member, said rear flange defining a rear free edge of said bed member; and a rear support rail structure supportively engaged under said pan member adjacent said rear flange and extending transversely across said pan member to provide reinforcement thereof, said rear flange being positioned in generally overlying relationship to one surface of said rail structure.

6. The vehicle bed assembly according to claim 5, wherein said rear support rail structure has upward rib projections thereon corresponding to said stiffening ribs in said floor member, said rib projections being aligned with and nestingly supportively engaged within said stiffening ribs to provide reinforcement of said pan member adjacent said rear edge.

7. The vehicle bed assembly according to claim 5, wherein said rear flange extends downwardly from a remainder of said roll-formed pan member which includes said ribs.

8. The vehicle bed assembly according to claim 7, wherein said rear flange overlaps and is fixed to a rear facing surface of said rear support rail structure.

* * * * *